(12) United States Patent
Peavey et al.

(10) Patent No.: US 7,513,766 B2
(45) Date of Patent: Apr. 7, 2009

(54) EXTRUSION APPARATUS HAVING A DRIVEN FEED SEGMENT

(75) Inventors: Jennifer S. Peavey, Greer, SC (US); Bradford E. Webster, Jr., Moore, SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 11/247,526

(22) Filed: Oct. 11, 2005

(65) Prior Publication Data

US 2007/0082079 A1    Apr. 12, 2007

(51) Int. Cl.
  *B29C 47/04*    (2006.01)
  *B29C 47/24*    (2006.01)
(52) U.S. Cl. ................. 425/133.1; 264/209.2; 425/381; 425/381.2; 425/382.3; 425/461; 425/462; 425/467
(58) Field of Classification Search ............... 425/133.1, 425/381, 381.2, 382.3, 461, 462, 466, 467; 264/209.2
See application file for complete search history.

(56) References Cited

U.S. PATENT DOCUMENTS

| | | | |
|---|---|---|---|
| 2,919,467 A | 1/1960 | Mercer | |
| 2,932,855 A | 4/1960 | Bartlett et al. | |
| 2,973,783 A | 3/1961 | Boe | |
| 3,051,989 A | 9/1962 | Mercer | |
| 3,122,788 A * | 3/1964 | Lieberman | 425/381.2 |
| 3,308,508 A | 3/1967 | Schrenk | |
| 3,404,203 A | 10/1968 | Donald | |
| 3,511,742 A | 5/1970 | Rasmussen | |
| 3,557,265 A | 1/1971 | Chisholm et al. | |
| 3,565,744 A | 2/1971 | Rasmussen | |
| 3,565,985 A | 2/1971 | Schrenk et al. | |
| 3,605,189 A | 9/1971 | Bauman et al. | |
| 3,632,282 A | 1/1972 | Rasmussen | |
| 3,632,711 A | 1/1972 | Rasmussen | |
| 3,649,143 A | 3/1972 | Papesh et al. | |
| 3,716,612 A | 2/1973 | Schrenk et al. | |
| 3,759,647 A | 9/1973 | Schrenk et al. | |
| 3,784,339 A * | 1/1974 | Springfeld | 425/133.1 |
| 3,801,429 A | 4/1974 | Schrenk et al. | |
| 3,802,826 A | 4/1974 | St. Eve | |

(Continued)

FOREIGN PATENT DOCUMENTS

WO    WO 00/76765    12/2000

OTHER PUBLICATIONS

Limper et al., "Homogeneous Melt Distribution Through Rotation," *Kunststoffe plast europe*, pp. 1-3, Dec. 2004.

Primary Examiner—Robert B Davis
Assistant Examiner—Joseph Leyson
(74) Attorney, Agent, or Firm—Alston & Bird LLP (57) ABSTRACT

The invention is an extrusion apparatus having a driven feed segment that is rotatably driven about central mandrel or within a housing member. Rotation of the driven feed segment subjects one or more streams of resin introduced onto a surface thereof to transverse shear during radial flow. One of more driven feed segments can be assembled with other components of conventional extrusion die assemblies. Extrusion die assemblies can include one or more driven feed segments rotated in the same or opposite direction of each other. The number of streams of resin and rotational speed of the driven feed segment can be controlled to produce microlayered film having in excess of 4000 layers.

30 Claims, 5 Drawing Sheets

U.S. PATENT DOCUMENTS

| | | |
|---|---|---|
| 3,809,515 A | 5/1974 | Farrell |
| 3,853,661 A | 12/1974 | Sudo |
| 3,856,448 A | 12/1974 | Iijima et al. |
| 3,860,372 A | 1/1975 | Newman, Jr. |
| 3,862,878 A | 1/1975 | Azuma |
| 3,884,606 A | 5/1975 | Schrenk |
| 3,966,861 A | 6/1976 | Papesh et al. |
| 4,019,844 A | 4/1977 | Ogasawara et al. |
| 4,039,364 A | 8/1977 | Rasmussen |
| 4,111,630 A | 9/1978 | Shiomi et al. |
| 4,203,715 A | 5/1980 | Raley et al. |
| 4,358,330 A | 11/1982 | Aronovici |
| 4,368,017 A | 1/1983 | Rasmussen |
| 4,403,934 A | 9/1983 | Rasmussen et al. |
| 4,420,451 A * | 12/1983 | Rasmussen .............. 264/209.2 |
| 4,426,344 A | 1/1984 | Dinter et al. |
| 4,436,568 A | 3/1984 | Rasmussen |
| 4,496,413 A | 1/1985 | Sharps et al. |
| 4,770,837 A | 9/1988 | Lu et al. |
| 4,784,594 A | 11/1988 | Sharps et al. |
| 4,798,526 A | 1/1989 | Briggs et al. |
| 4,966,807 A | 10/1990 | Harvey et al. |
| 5,076,776 A | 12/1991 | Yamada et al. |
| 5,094,788 A | 3/1992 | Schrenk et al. |
| 5,094,793 A | 3/1992 | Schrenk et al. |
| 5,269,995 A | 12/1993 | Ramanathan et al. |
| 5,288,529 A | 2/1994 | Harvey et al. |
| 5,387,386 A | 2/1995 | Kirjavainen |
| 5,389,324 A | 2/1995 | Lewis et al. |
| 5,843,539 A | 12/1998 | Harvey et al. |
| 6,045,737 A | 4/2000 | Harvey et al. |
| 6,086,239 A | 7/2000 | Järvenkylä et al. |
| 6,158,999 A | 12/2000 | Hartman et al. |
| 6,183,672 B1 | 2/2001 | Franke et al. |
| 6,197,239 B1 | 3/2001 | Kirjavainen et al. |
| 6,203,740 B1 | 3/2001 | Kirjavainen et al. |
| 6,217,206 B1 | 4/2001 | Kirjavainen et al. |
| 6,309,574 B1 | 10/2001 | Järvenkylä et al. |
| 6,352,425 B1 * | 3/2002 | Lupke et al. .............. 425/381.2 |
| 6,413,595 B1 | 7/2002 | Schirmer |
| 6,416,211 B1 | 7/2002 | Kirjavainen et al. |
| 6,450,429 B1 | 9/2002 | Kirjavainen |
| 6,533,973 B1 | 3/2003 | Franke et al. |
| 6,599,451 B2 | 7/2003 | Franke et al. |
| 6,722,778 B2 | 4/2004 | Kirjavainen |
| 6,767,501 B1 | 7/2004 | Kirjavainen |
| 6,837,698 B2 | 1/2005 | Floyd et al. |
| 6,905,324 B2 | 6/2005 | Cloeren |
| 6,936,203 B2 | 8/2005 | Reilly et al. |
| 7,008,204 B2 | 3/2006 | Franke et al. |
| 7,105,117 B2 | 9/2006 | Rodgers et al. |
| 7,128,862 B2 | 10/2006 | Wang |
| 2003/0201565 A1 | 10/2003 | Cloeren |
| 2005/0029691 A1 | 2/2005 | Cloeren |
| 2005/0095411 A1 | 5/2005 | Rasmussen |
| 2006/0055076 A1 | 3/2006 | Cloeren |

* cited by examiner

EXTRUSION APPARATUS HAVING A DRIVEN FEED SEGMENT

BACKGROUND OF THE INVENTION

Extrusion equipment can be used for producing articles including films, tubes, sheets, foams, parisons, injected molded items and other articles comprising one or more thermoplastic resins. Extrusion dies have been used to form a variety of articles by feeding, melting and conveying thermoplastic resins through flow channels that split the polymeric melt into finer polymer streams that may then be introduced onto one or more feed segments. Feed segments generally comprise a surface on which the individual stream melts may be distributed and recombined to form a melt having a desired thickness and shape. The melt flow may then travel towards a discharge outlet where it can be extruded into a film or shaped article. An ending gap, located in the vicinity of the discharge outlet, controls the emerging thickness of the resulting product wall. In some instances, a feed portion supplying polymer to the die can contain more than one modular feed segment.

In some instances, extrusion assemblies produce an annular film or sheet. In some annular arrangements, disks or frusta can be arranged one on top of another, in a type of "pancake stack" or "stacked platter" fashion. In such cases, one or more feed segments direct molten resin toward a common annular channel where separate streams of molten polymer combine and exit the die through a discharge outlet. After exiting the die, the combined polymer streams are cooled to form articles such as multilayered films or multi-colored articles.

Extrusion dies, especially co-extrusion dies, have generally gained wide acceptance. However, they still have disadvantages and limitations. One common disadvantage of extrusion dies relates to non-homogeneous delivery and/or distribution of molten resin and blends within feed segments. Such non-homogeneities can result in weaknesses or noticeable blemishes within extruded articles, for instance film products.

Thus, there still exists the need for extrusion dies that can process fluids such as molten thermoplastic resins while controlling the homogeneity of fluid blends and/or combined streams.

BRIEF SUMMARY OF THE INVENTION

In one embodiment, the extrusion apparatus comprises a driven feed segment that is rotatably disposed on a support member. The driven feed segment comprises an outer circumference, a bore defining an inner circumference, and a first surface for receiving a fluid, such as molten resin thereon. The extrusion apparatus may comprise an annular gap through which resin may flow from the surface of the driven feed segment in the direction of a discharge outlet.

Rotation of the driven feed segment imparts a transverse shear to the molten resin as the molten resin advances radially across a surface of the driven feed segment. As a result, the molten resin may be subjected to both axial and transverse shear. Rotation of the driven feed segment can also impart a transverse shear to the molten resin as it advances axially in the annular gap. As a result, the molten resin may be subjected to both radial and transverse shear. Imparting a transverse shear into the resin may improve the mechanical and barrier properties of the film. The transverse shear may also orient molecules within the film in a direction away from the machine direction of the annular flow, which may result in improving mechanical properties of the film such as the strength. In addition, spiraling of the resin may result in a "smearing" action that causes defects in the layers to be blended together.

In one embodiment, the extrusion apparatus may comprise a housing member having a circular bore in which the at least one driven feed segment is rotatably disposed. In some embodiments, the support member comprises a component that may be removably disposed within the bore of the housing member. In this embodiment, the annular gap may be disposed between the driven feed segment and the housing member. In some embodiments, the support member may include an annular recess in which the driven feed segment may be rotatably disposed so that the annular gap is disposed between an outer circumference of the support member and the housing member. In this embodiment, rotation of the support member is fixed relative to the driven feed segment so that transverse shear is curtailed prior to entry of the molten resin into the annular gap.

In another embodiment, the extrusion apparatus comprises a central mandrel about which the driven feed segment may be rotatably disposed. In one embodiment, the driven feed segment comprises a bore that defines an annular gap between an outer circumference of the central mandrel and an inner circumference of the driven feed segment. The annular gap defines a resin pathway through which the resin may travel in the direction of an exit orifice. In this embodiment, the extrusion apparatus may include a support member upon which the driven feed segment is rotatably disposed. In one embodiment, the support member may include an inner circumferential wall defining a recess in which the driven feed segment may be rotatably disposed. In this embodiment, the annular gap may be disposed between the inner circumference of the support member and the outer circumference of the mandrel. The inner circumferential wall may include a surface upon which molten resin flows from the surface of the driven feed segment to the annular gap. Rotation of the support member may be fixed relative to the driven feed segment so that transverse shear is curtailed prior to entry of the molten resin into the annular gap.

In one embodiment, the driven feed segment may be rotatably driven with a variety of different methods. For example, the extrusion apparatus may include a drive assembly comprising a drive gear that is attached to a drive shaft and is in mechanical communication with a ring gear that is attached to the inner or outer circumference of the driven feed segment. Rotation of the drive shaft causes the gears on the drive gear to drivingly intermesh with the gears of the ring gear to thereby transfer rotational energy to the driven feed segment. The rate at which the driven feed segment may be rotated can be varied to control and adjust the properties of the resulting thermoplastic article.

In another embodiment, a stationary end cap, or a stationary disk-like module, or a housing of another driven feed segment, may be positioned opposite the first surface of the driven feed segment to thereby define a radial gap therebetween. The clearance of the radial gap may be varied to affect the shear properties of molten resins, for example, to thereby tailor the structure and strength of the resulting cooled extrudate.

In one embodiment, the transverse shear imparted to one or more resin streams can improve homogeneous melt distribution between each stream and can also help obscure "weld lines" that can occur between adjacent streams or microstreams. The number and orientation of each stream can be varied depending upon the desired characteristics of the resulting film. As streams enter the annular gap and emerge through the exit orifice, they are cooled to form a film having a plurality of individual layers. In one embodiment, resin constituents can deliver film having micro-layered substructure as or within the overall structure. At high rates of rotation, constituent streams can be sheared together to the extent that the streams are somewhat homogenized, resembling substantially uniform film product similar in structure to a polymer blend. Such shear blending can be used to combine two substantially immiscible resins into a stable relatively uniform film layer. Rotation can be used to improve the distribution of additives within the layer of film. Additives such as organoclays, inorganics, nanocomposites and the like can be introduced to produce unique films.

In addition, the number of streams introduced to the surface of the driven feed segment, the initial width of each stream, and the orientation of streams within the emerging layered film can be controlled to modify various film properties. For example, the inventive extrusion apparatus having at least one driven feed segment can be used to adjust the properties of the multi-layer film, such as the barrier properties, optical properties, electrical properties, thermal stability, tear resistance, and/or tensile strength. The invention can be used to combine dissimilar resins, for instance barrier and non-barrier resins.

Thus, the invention provides an extrusion apparatus that may be used to subject one or more streams of molten resin to multi-directional shear so that articles may have improved properties such as homogeneity, and so that dispersion of particles therein may be produced.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

While invention can be embodied in various extrusion assemblies and using various orientations to deliver molten resin, for simplicity, drawings will illustrate modes to deliver polymer downwardly. It will be clear to those having ordinary skill in the art of polymer extrusion that other orientations can be employed if one wishes to extrude upwardly, as is common in certain blown film manufacture, or horizontally, as in common in other film or foam manufacture, or in any suitable orientation between vertical and horizontal.

Figure 1A:
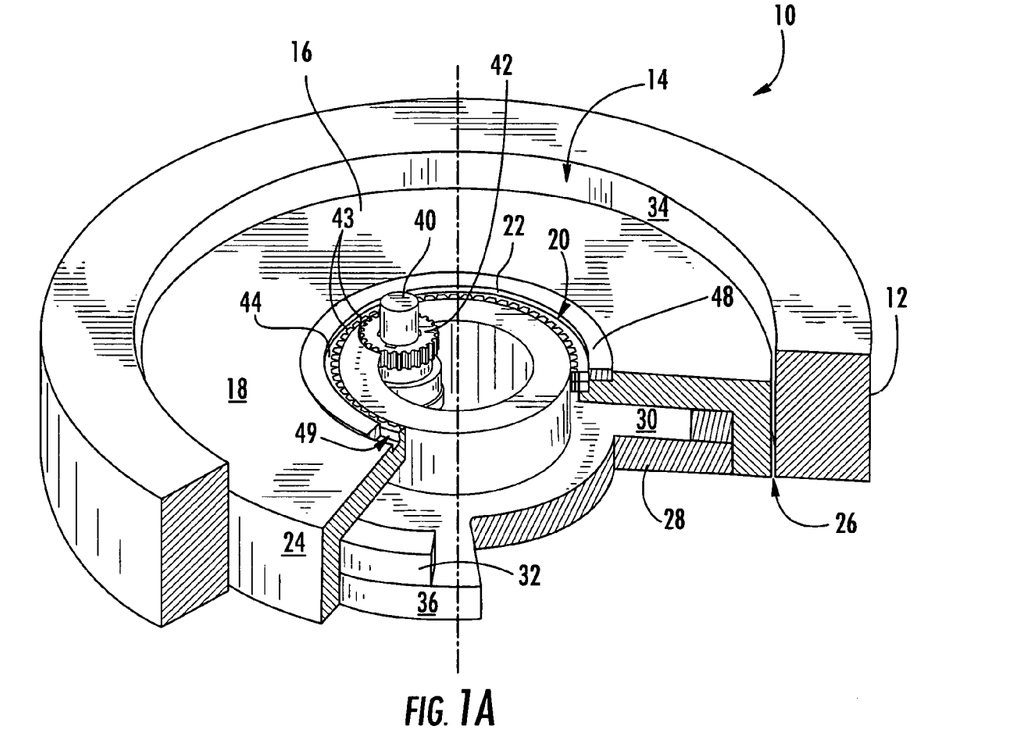
FIG. 1A is a cutaway perspective view of an extrusion apparatus depicting a driven feed segment that is rotatably disposed within a bore of a housing member and includes a support member having an outer circumference that is less than the outer circumference of the driven feed segment.
Figure 2A:
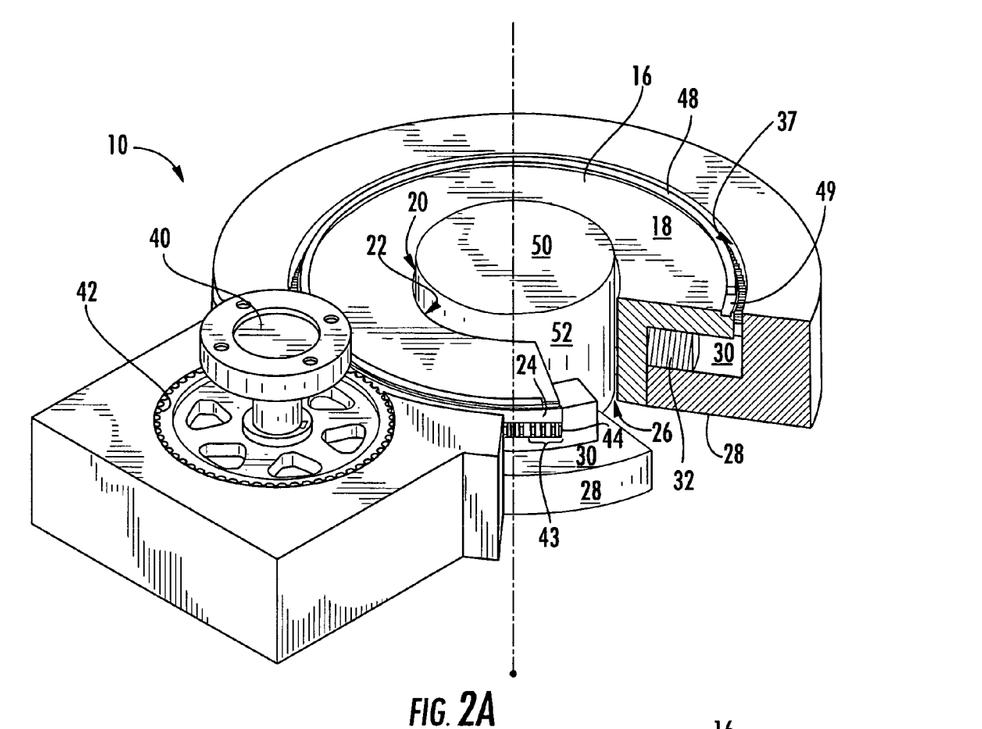
FIG. 2A is a cutaway perspective view of an extrusion apparatus wherein the driven feed segment is rotatably disposed about a central mandrel and includes a support member having an inner circumference that is greater than the inner circumference of the driven feed segment.

With reference to FIGS. 1A and 2A, an extrusion apparatus having at least one driven feed segment is illustrated and broadly designated by reference number 10. In one embodiment, the extrusion apparatus may include a support member 28 upon which at least one driven feed segment 16 is rotatably disposed. With reference to FIG. 1A, the extrusion apparatus may include a housing member 12 having a circular bore 14 in which the driven feed segment 16 may be rotatably disposed. Driven feed segment 16 includes a first surface 18 upon which a fluid, such as a molten resin, may be introduced. In some embodiments, the driven feed segment includes a bore 20 defining an inner circumference 22 and an outer circumference 24. The extrusion apparatus 10 may also include an annular gap 26 through which a fluid can flow off the surface of the driven feed segment. In one embodiment, the annular gap may define a fluid pathway through which a fluid may travel towards an exit orifice. Rotation of the driven feed segment upon the support member applies a transverse shear to a fluid as it advances across surface 18 in the direction of the annular gap 26.

In some embodiments, the inner circumference 22 of driven feed segment may also impart transverse shear to the fluid after the fluid has entered the annular gap. As a result, the fluid may be subjected to both radial and transverse shear. In other words, one or more streams continue to flow spirally in the direction of an exit orifice. In the context of the invention, the term "feed segment" includes a structure, such as disc, plate, frusta, or the like, on which one or more melt streams may be introduced and combined to form a single or multi-layered polymeric stream.

In some embodiments, the extrusion apparatus may also include a support member 28 that is disposed in the circular bore 14 of the housing member 12. In other embodiments, the support member 28 may comprise a separate component of the extrusion apparatus that may be removably disposed about a central mandrel. In some embodiments, a friction reducing member 32 may be disposed between the support member 28 and the driven feed segment 16 to help facilitate rotation of the driven feed segment. As shown in FIG. 1A, the support member 28 may comprise a separate component of the extrusion apparatus that may be removably disposed within the circular bore of the housing member. In other embodiments, as shown in FIG. 2A, the support member 28 may comprise a separate component of the extrusion apparatus that may be removably disposed about a central mandrel.

The extrusion apparatus may also include a means for rotatably driving the driven feed segment upon the support member 28. In some embodiments, the driven feed segment may be rotatably driven with a drive device, such as a driven drive shaft 40 that is in mechanical communication with one or more gears 42, 44 that may be capable of transferring rotational energy from the drive shaft to the driven feed segment. In one embodiment, gear 42 can directly engage ring gear 44. In other embodiments, the drive device may include one or more intermediate gears that can be used to transfer rotational energy from drive gear 42 to ring gear 44 (see briefly FIG. 3, reference number 45). A motor (not shown) can be used to activate and control the speed of drive shaft 40. Other methods for rotatably driving the driven feed segment are discussed in further detail below.

Figure 1B:
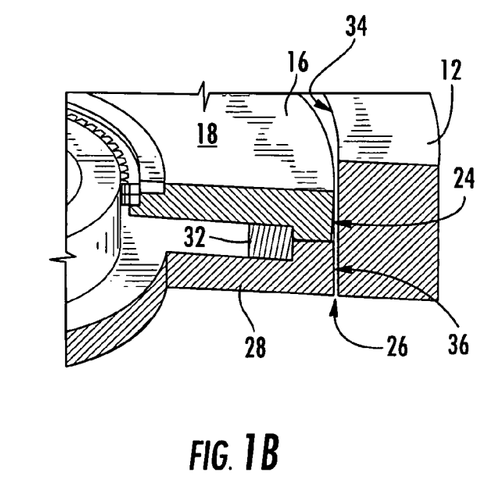
FIG. 1B is a cutaway perspective view of an extrusion apparatus depicting a driven feed segment that is rotatably disposed within a bore of a housing member and includes a support member having an outer circumference that is substantially the same as the outer circumference of the driven feed segment.
Figure 1C:
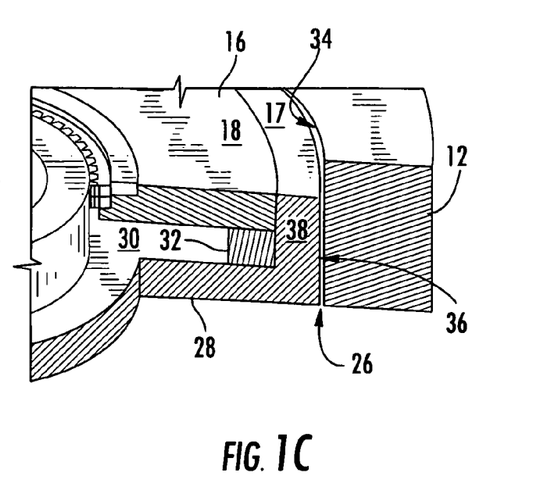
FIG. 1C is a cutaway perspective view of an extrusion apparatus depicting a driven feed segment that is rotatably disposed within a bore of a housing member and includes a support member having an outer circumference that is greater than the outer circumference of the driven feed segment.

FIGS. 1A through 1C illustrate various embodiments wherein the annular gap 26 is disposed between the driven feed segment 16 and a housing member 12. As discussed above, driven feed segment 16 may include outer circumference 24 and a bore 20 defining inner circumference 22. In this embodiment, clearance between outer circumference 24 of the driven feed segment 16 and an inner circumference 34 of housing member 12, defines an annular gap 26. Annular gap 26 defines a fluid pathway between the driven feed segment 16 and the housing member 12, through which at least one fluid can travel toward an exit orifice. Driven feed segment 16 can be rotatably disposed within circular bore 14 of housing member 12.

In one embodiment, support member 28 having an outer circumference 36 resides within the circular bore 14 of housing member 12. As shown in FIG. 1A, the outer circumference 36 of support member 28 can be less than the outer circumference 24 of driven feed segment 16. In some embodiments, the outer circumference 24 of driven feed segment 16 can be substantially the same as the outer circumference 36 of the support member 28. In this regard, FIG. 1B illustrates an embodiment where the outer circumference 24 of the driven feed segment 16 and the outer circumference 36 of the support member 28 define a common outer circumference. In this embodiment, annular gap 26 is defined by the distance between the inner circumference 34 of the housing member and the outer circumferences 24, 36 of the driven feed segment and the support member, respectively.

In other embodiments, the outer circumference of the support member can be greater than the outer circumference of the driven feed segment. In this regard, FIG. 1C illustrates an embodiment wherein the distance between the inner circumference of the housing member 12 and the outer circumference 36 of the support member 28 define annular gap 26. In one embodiment, support member 28 may include an outer circumferential wall 38 that extends upwardly from surface 30 and defines the outer circumference 36 of the support member 28. In one embodiment, the outer circumferential wall 38 may included a first upper surface 17 for receiving fluid advancing from surface 18. The distance between the outer circumference 36 of the support member and the inner circumference 34 of the housing member 12 define annular gap 26. Surface 17 may also be stationary with respect to driven feed segment. In one embodiment, surface 17 may be substantially coplanar with the surface 18 of the driven feed segment 16 so that a fluid advancing toward annular gap 26 can pass from surface 18 to surface 17 of wall 38. In this embodiment, the molten resin flows radially across the surface of the driven feed segment, and then advances radially across a stationary surface 17 of the support member wall 38 prior to flowing into the annular gap 26. Stationary surface 17 may help reduce the influence of transverse shear which results from the rotation of driven feed segment 16. As a result, transverse shear interaction between a resin entering the annular gap from driven feed segment 16 and a resin being delivered from other feed segments may be reduced, and the transverse shear is curtailed prior to entry of the molten resin into the annular gap. This embodiment may reduce the effect of transverse shear upon other resins within an annular gap.

As discussed above, the extrusion apparatus 10 may include a drive device for rotatably driving the driven feed segment within circular bore 14. In one embodiment, the drive device may comprise a drive shaft 40 that is disposed in the bore 20 of the driven feed segment. In this regard, FIG. 1A illustrates an embodiment wherein the inner circumference 22 of the driven feed segment 16 includes a plurality of teeth 43 that drivingly intermesh with a plurality of teeth on gear 42. In one embodiment, the plurality of teeth may be disposed on ring gear 44 that may be attached to the inner circumference of the driven feed segment. In other embodiments, the plurality of teeth 43 may be an integral part of driven feed segment 16. As shown, drive shaft 40 may provide rotational energy to ring gear 42, which in turn may drivingly intermesh with ring gear 44 so that rotational energy is provided to driven feed segment 16. Other methods of driving the driven feed segment are discussed in greater detail below.

Figure 2B:
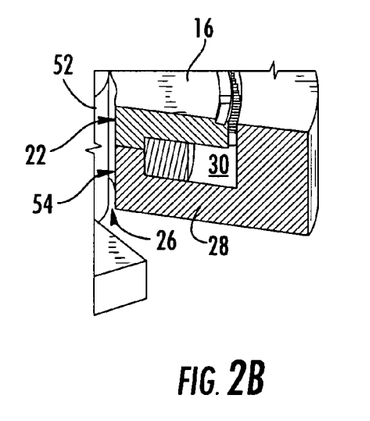
FIG. 2B is a cutaway perspective view of an extrusion apparatus wherein the driven feed segment is rotatably disposed about a central mandrel and includes a support member having an inner circumference that is substantially the same size as the inner circumference of the driven feed segment.
Figure 2C:
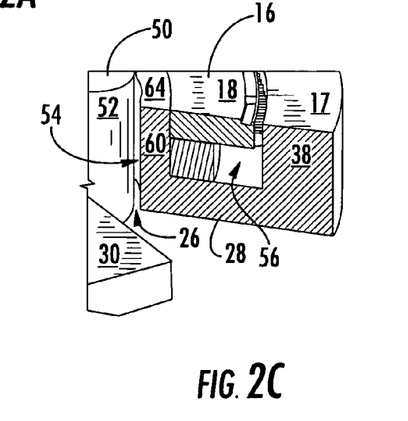
FIG. 2C is a cutaway perspective view of an extrusion apparatus wherein the driven feed segment is rotatably disposed about a central mandrel and includes a support member having an inner circumference that is less than the inner circumference of the driven feed segment.

With reference to FIGS. 2A through 2C, an embodiment of the invention is illustrated wherein the extrusion apparatus includes a mandrel about which the driven feed segment may be rotatably disposed. In this embodiment, the driven feed segment 16 may include a bore 20 having an inner circumference 22 through which the driven feed segment may be rotatably disposed about central mandrel 50. As shown, mandrel 50 having outer circumference 52 is disposed within bore 20 of driven feed segment 16 and within circular bore 37 of support member 28. In one embodiment, clearance between the outer circumference 52 of the mandrel 50 and inner circumference 22 of driven feed segment 16 may define annular gap 26. Annular gap 26 may define a fluid pathway between the driven feed segment and mandrel, through which at least one fluid can travel towards an exit orifice.

Support member 28 may include a surface 30 that extends radially inward from the circular bore 37 of the support member 28. To help facilitate rotation of the driven feed segment, a friction reducing member 32 may be disposed between support member 28 and driven feed segment 16.

In one embodiment, the support member 28 may include an inner circumference 54 that is substantially the same size as the inner circumference 22 of the driven feed segment. In this regard, FIG. 2B illustrates an embodiment, wherein the inner circumference 54 of support member 28 and the inner circumference 22 of the driven feed segment 16 define a common inner circumference. In this embodiment, annular gap 26 is defined by the distance between the outer circumference 52 of the mandrel 50 and the common inner circumferences 22, 54 of the driven feed segment 16 and the support member 28, respectively. The distance between common inner circumferences 54 and 22 and mandrel outer circumference 52, define annular gap 26.

In other embodiments, the inner circumference 54 of the support member 28 can be greater than the inner circumference 22 of the driven feed segment 16. In this regard, FIG. 2C illustrates an embodiment wherein the distance between the outer circumference 52 of the mandrel 50 and the inner circumference 54 of the support member 28 defines annular gap 26. In this embodiment, the support member may include a recess 56 in which the driven feed segment 16 may be rotatably disposed. In one embodiment, recess 56 of support member 28 defines a outer circumferential wall 38 having a first upper surface 17 and an inner circumferential wall 60, having second upper surface 64 for receiving fluid advancing from surface 18. The distance between the inner circumference 54 of the support member 28 and the outer circumference 52 of the mandrel 50 define annular gap 26. In some embodiments, the driven feed segment may have a "ring-like" shape and may be rotatably disposed within recess 56 so that the driven feed segment does not extend to the annular gap. Surface 64 may also be stationary with respect to driven feed segment 16. In one embodiment, surface 64 may be substantially coplanar with the surface 18 of the driven feed segment 16 so that a fluid advancing toward annular gap 26 can pass from surface 18 to surface 64 of wall 60. Stationary surface 64 may help reduce the influence of transverse shear which results from the rotation of driven feed segment 16 so that transverse shear is curtailed prior to entry of the molten resin into the annular gap. As a result, transverse shear interaction between a resin entering the annular gap from driven feed segment 16 and a resin being delivered from other feed segments may be reduced. This embodiment may help reduce the effect of transverse shear upon other resins within the annular gap.

In the embodiment illustrated in FIGS. 2A through 2C, the extrusion apparatus may include a drive device that is disposed externally, with respect to the driven feed segment. In this regard, the drive device may comprise a drive shaft 40 having a ring gear 42 that is in mechanical communication with a plurality of teeth 43 that are disposed about the outer circumference of the driven feed segment 16. The plurality of teeth 43 drivingly intermesh with a plurality of teeth on gear 42. In one embodiment, the plurality of teeth may be disposed on ring gear 44 that may be attached to the outer circumference of the driven feed segment. In other embodiments, the plurality of teeth 43 may be an integral part of driven feed segment 16. As shown, drive shaft 40 may provide rotational energy to ring gear 42, which in turn may drivingly intermesh with ring gear 44 so that rotational energy is provided to driven feed segment 16.

In some embodiments, the extrusion apparatus may also include a means for preventing resin from flowing inwardly/outwardly in a direction opposite the annular gap. For example, in the embodiment illustrated in FIG. 1A, the resin may be prevented from flowing inwardly in the direction of the inner circumference of driven feed segment 16, and in FIG. 2A, a resin may be prevented from flowing outwardly. In one embodiment, the surface of the driven feed segment may include a slip-ring, seal, or gasket that may substantially prevent backflow of the resin. In this regard, FIGS. 1A and 2A illustrate an embodiment where a slip ring 48 may be disposed in an inner circumferential portion or outer circumferential portion on the surface 18 of driven feed segment 16, the position of which depends on the position of the annular gap with respect to the inner or outer circumferences of the driven feed segment. In some embodiments, the slip ring may be disposed in an annular channel 49 formed in the surface 18 of the driven feed segment. The slip ring may help reduce or prevent the flow of molten resin onto gear 44. In one embodiment, the slip ring may comprise TEFLON™ tetrafluoroethylene fluorocarbon polymer, a silicone, a ceramic, a heat resistant polymeric material, and the like. Other methods of preventing the backflow of resin may include a plurality of grooves that are formed in an inner/outer circumferential portion on the surface of the driven feed segment (see briefly FIG. 3, reference number 70). In this embodiment, the grooves comprise a reverse spiral that is formed in a direction that is opposite the rotation of the driven feed segment. As a result, rotation of the driven feed segment causes any resin to be effectively pumped back in the direction of the melt stream. In some embodiments, a bottom surface (not visible) of the driven feed segment may include a second spiral groove for pumping resin back in the direction of the melt stream.

In some embodiments, the extrusion apparatus may also include a friction reducing member that may help the rotation of the driven feed segment 16. For example, in some embodiments, the surface of the driven feed segment may be disposed adjacent to a fixed surface within the extrusion apparatus, such as the lower surface of a distribution plate or other static or driven feed segment. As driven feed segment 16 is rotated upon the support member 28, the friction reducing member can help reduce friction between driven feed segment 16 and an adjoining stationary or movable die module. In one embodiment, the friction reducing member may include a slip ring made from a material such as TEFLON™ tetrafluoroethylene fluorocarbon polymer, a silicone, a ceramic, a heat resistant polymeric material, and the like. Other means can be used to reduce friction including bushings, roller bearings, thrust bearings, the molten polymer itself, and the like. In some embodiments, the slip ring may also help facilitate rotation and may also help prevent the backflow of resin. In another embodiment, the surface 18 of the driven feed segment may include a groove to receive a plurality of balls that may facilitate rotation of the driven feed segment within the extrusion apparatus (see briefly FIG. 3, reference number 72).

In some embodiments, a friction reducing member 32, such as a bearing, may also be disposed between the driven feed segment 16 and the support member 28. Friction reducing member 32 (see e.g. FIGS. 1B and 1C) may help facilitate the rotation of the driven feed segment 16 over support member 28. In one embodiment, friction reducing member 32 can comprise a tapered roller bearing. In one embodiment, the slip ring 48 can function both as a means for preventing resin from flowing inwardly/outwardly in a direction opposite the annular gap, as well as a friction reducing member 32.

As discussed above, the extrusion apparatus may include a drive device that is capable of rotatably driving the driven feed segment upon the support member. In some embodiments, the drive device may be operable to rotatably drive the driven feed segment 16 within the circular bore 14 of the housing member 12 or about the outer circumference 52 of the mandrel 50. Means of driving the driven feed segment may include, for instance, mechanical force, electromagnetic force, or hydraulic force. Drive means can engage a driven feed segment along a second surface opposite that of the first surface for receiving fluid, or along the inner or outer circumference of the driven feed segment. In one embodiment, the drive means includes at least one drive shaft in mechanical communication with one or more gears which in turn rotate the driven feed segment in relation to a mandrel or housing member. The drive shaft can be rigid or flexible, and can employ e.g. one or more terminal helical gears (worm gears), gear wheels, beveled gears, or sprockets to transfer energy to the driven feed segment.

Figure 3:
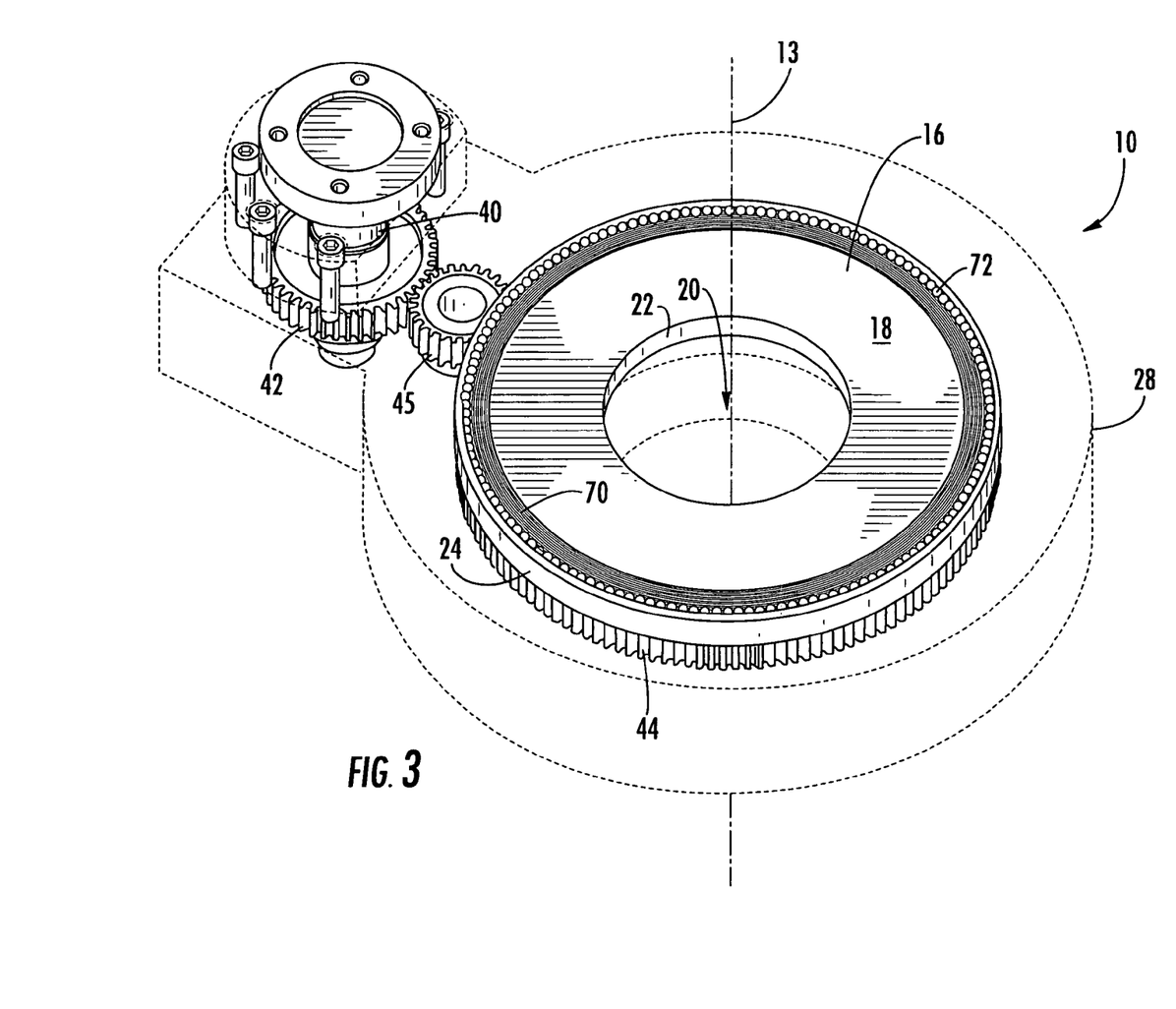
FIG. 3 is a perspective view of a driven feed segment wherein the drive assembly includes an intermediate gear.

With respect to FIG. 3, an embodiment of the extrusion apparatus 10 is illustrated wherein the drive assembly includes an intermediate gear 45 disposed between ring gear 44 and drive gear 42. In the illustrated embodiment, the drive assembly comprises a drive shaft 40 having a drive gear 42 that is in mechanical communication with a ring gear 44 that is attached adjacent to the outer circumference 24 of the driven feed segment 16. The drive gear 42 may be in direct contact with the ring gear 44 or, as shown, an intermediate gear 45 may be used to transfer rotational energy from drive gear 42 to ring gear 44.

Other methods of driving the driven feed segment may include, but are not limited to, belt and pulley, chain and sprocket, electromagnetic drives, and the like. In another embodiment, at least one driven feed segment may be hydraulically driven, for example, by the force of molten polymer resin or oil impinging on tooled surface features or passageways of the driven feed segment. In this embodiment, feed segment tooling may be used to control rotation speed in response to impinging fluid. In some embodiments, the driven feed segment may be electrically driven. For example, the driven feed segment may include permanent magnets that act as a rotor in response to one or more coils present in the support member which can serve as the stator of an electrical motor. In yet another embodiment, the extrusion apparatus may include a mandrel that serves as a stator to electrically drive the driven feed segment.

Depending on the desired result, the driven feed segment may be driven at rates of rotation in excess of 10, 25, and 50 revolutions per minute (RPM), or can rotate at speeds of from about 1 to 20 RPM. Rotational speeds contemplated include from 1 to 50 RPM, such as from 2 to 40 RPM, from 10 to 30 RPM, or from 10 to 25 RPM, and such as from 10 to 20 RPM, or from 5 to 25 RPM.

In one embodiment, surface 18 of driven feed segment 16 may comprise a substantially planar surface. In the context of the invention, the term "substantially planar" is used to describe disc or plate-like geometry. As shown in FIG. 3, planar angle is defined between surface 18 of the driven feed segment 16, relative to the longitudinal central axis 13. In one embodiment, the planar angle between surface 18 and longitudinal central axis 13 can be substantially perpendicular; for example, the planar angle can be within about 5 degrees of perpendicular to 13. In another embodiment, the planar angle can deviate about 1 degree or less from perpendicular relative to axis 13. In another embodiment, the surface 18 of the driven feed segment 16 can establish an angle between surface 18 and longitudinal central axis 13 from about 5 to 45 degrees from perpendicular. Thus, the planar angle defined between surface 18 and the longitudinal central axis 13 can range for example between substantially planar, substantially perpendicular to a more tilted substantially conical geometry, as in an embodiment in which the planar angle can be 45 degrees.

In an alternative embodiment, surface 18 of driven feed segment 16 may include additional surface features, such as a beveled edge along the inner circumference or outer circumference of driven feed segment 16. The beveled edge can be useful for controlling the velocity of the resin as it enters the annular gap.

Figures 4A, 4B:
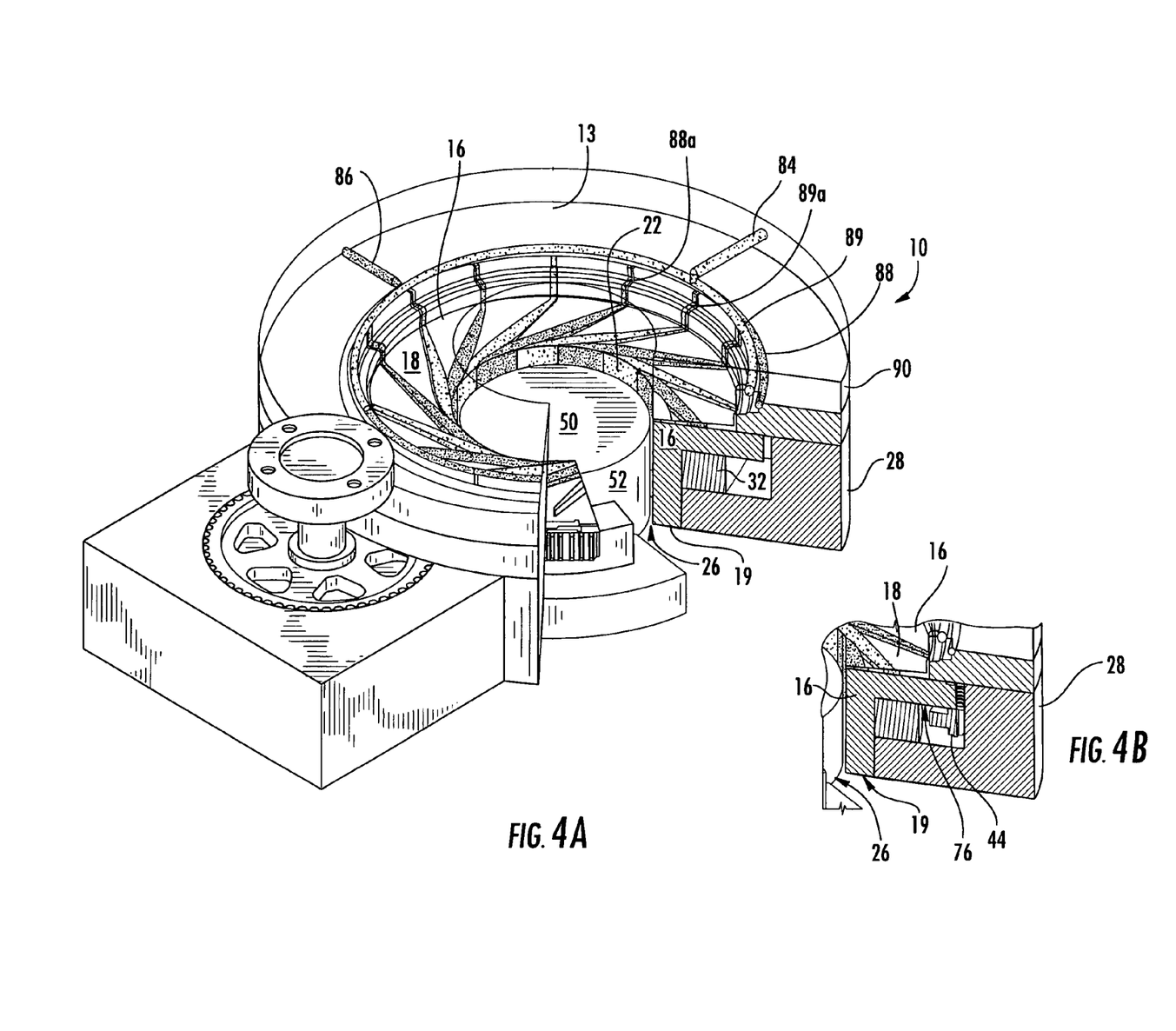
FIG. 4A is a cutaway perspective view of an extrusion apparatus depicting two resin melt streams being introduced from a plurality of fluid feed ports onto a first surface of a driven feed segment.
FIG. 4B is a cutaway perspective view of an extrusion apparatus depicting a ring gear affixed to the second surface of the driven feed segment.

FIGS. 4A and 4B illustrate the delivery of two fluids, such as molten resins, onto surface 18 of a driven feed segment 16. Two fluid streams 84, 86 can flow from one or more intake ports into melt distribution channels 88, 89. Feed ports 88a, 89a are illustrated that are in flow communication with distribution passageway 88, 89 respectively. The combination of distribution pathways and feed ports defines one or more resin passageways through which molten resin can be supplied to surface 18 of the driven feed segment 16. The number of streams of resin supplied to surface 18 of driven feed segment can be controlled by decreasing or increasing the number of feed ports 88a, 89b. In one embodiment, there can be more than two groups of feed ports for more than two molten resins to be fed to surface 18.

In FIG. 4A an end capsule module 90 is depicted in phantom lines as being disposed above driven feed segment. Rotation of a driven feed segment 16 causes fluid flowing along surface 18 to spiral inwardly as it advances in the direction of an annular gap 26. In the illustrated embodiment, the annular gap 26 is defined by the distance between the inner circumference 22 of the driven feed segment 16 and the outer circumference 52 of a mandrel 50. As illustrated, rotation of at least one driven feed segment can cause fluid streams to form discrete bands on and from the surface of the driven feed segment. Rotation of the driven feed segment imparts a transverse shear to the molten resin as the molten resin advances radially across a surface of the driven feed segment. As discussed in greater detail below, imparting a transverse shear into the resin may improve the mechanical and barrier properties of the film. The transverse shear may also orient molecules within the film in a direction away from the machine direction of the annular flow, which may result in improving mechanical properties of the film such as the strength. In addition, spiraling of the resin may result in a "smearing" action that causes defects in the layers to be blended together. In one embodiment, the transverse shear may also be used to form microlayered structures, such as films.

Resin entering annular gap 26 may be subjected to further axial shear as it advances along and within annular gap 26. Streams of resin spiral inwardly in helicoidal fashion into and through annular gap 26, continuing in the direction of the die exit orifice. Rotation of a driven feed segment imparts transverse shear during annular flow as resin travels a path length at least equal to the thickness of the driven feed segment en route to the die exit. The axial path length of one segment can be defined by the distance between first surface 18 and second surface 19 of the driven feed segment. The thickness and the rotational speed of the driven feed segment can be selected to control axial shear, in addition to the above mentioned transverse shear within the annular gap. When placed with other components to produce an extrusion assembly, the molten resin can be discharged from the extrusion apparatus through an extrusion orifice (not shown) that is in fluid communication with annular gap 26.

In FIG. 4B a portion of the ring gear 44 is disposed at least partially below driven feed segment 16. In this embodiment, the ring gear is depicted as being attached to a lower surface 76 (i.e., third surface) of the driven feed segment.

Figure 5:
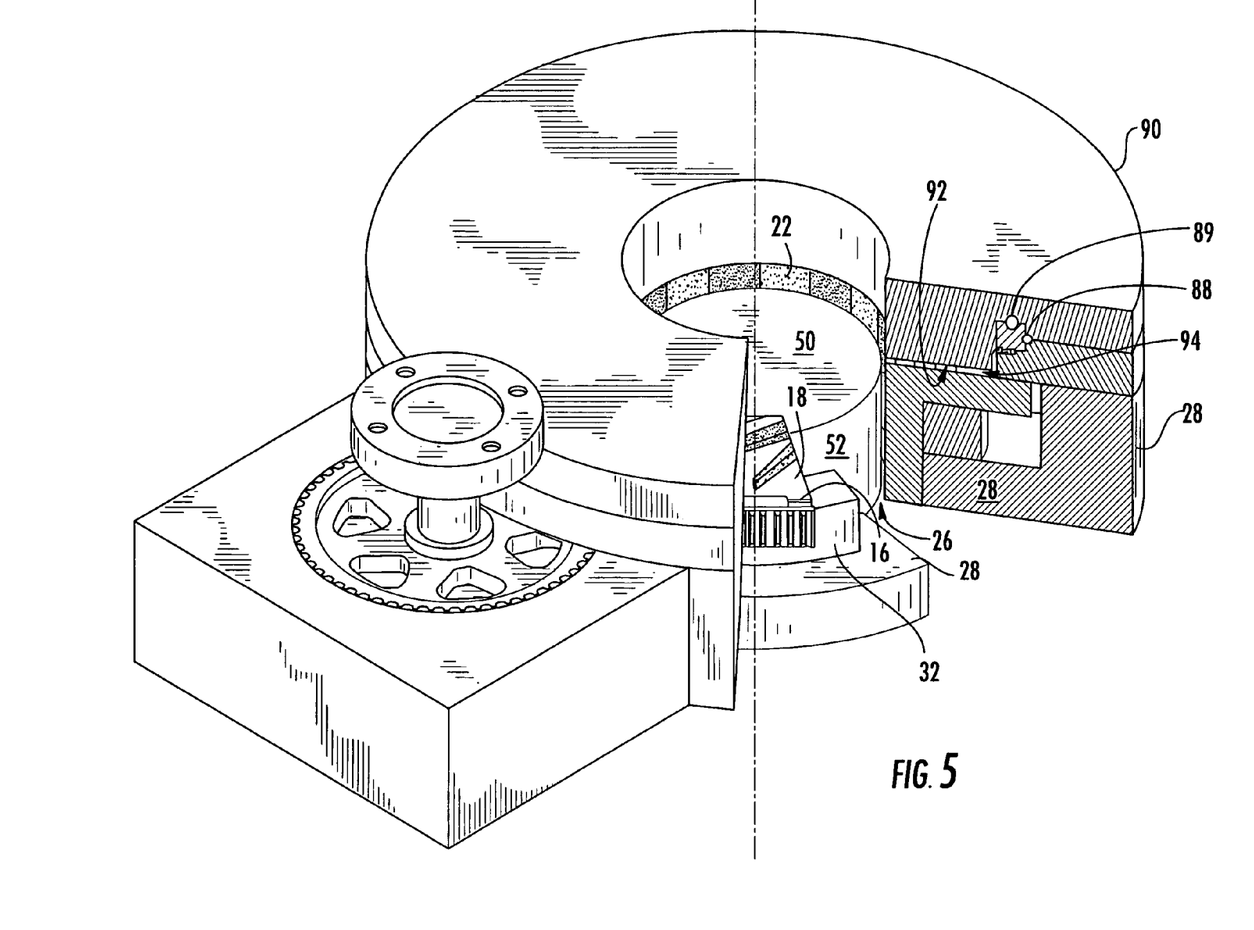
FIG. 5 is a cutaway perspective view of an extrusion apparatus depicting two fluids flowing into the annular gap as stripes, and illustrating the radial gap defined between a stationary module disposed above the driven feed segment.

With reference to FIG. 5, a cross sectional perspective view of an extrusion apparatus 10 having a end cap module 90 is illustrated. As shown the extrusion apparatus includes an end cap module 90 having second surface 92, installed adjacent to support member 28 and driven feed segment 16. In one embodiment, end cap module may be stationary. Surface 92 of the end cap module 90 may be disposed substantially parallel to surface 18 of driven feed segment 16. In some embodiments, the distance between surface 18 of the driven feed segment and the second surface 92 of the end cap module 90 may define a radial gap 94 therebetween. A radial gap 94 defined between surface 16 and opposing surface 92 of adjoining module defines a pathway in which resin may flows radially in the direction of the annular gap 26. The rotation of driven feed segment 16 relative to the substantially parallel surface 92 may induce transverse shear within one or more resins flowing within radial gap 94. As previously illustrated in FIGS. 4A and 4B, streams of resin flowing toward an inner annular gap can striate into finer bands that flow between the surface of driven feed segment 16 and a second substantially parallel surface 92 in radial gap 94. In some embodiments, the thickness of the radial gap can be selected to control transverse and axial shear and residence time to which one or more resin is subjected. Surface 92 can be established by a surface of an end cap, by a surface of a static disk-like module, or by a surface of a housing member of another driven feed segment positioned above. The thickness of radial gap 94 (clearance between surfaces 18 and 92), can be adjusted by the relative position of surface 18 or 92.

The diameter and thickness of the driven feed segment can be varied depending upon constraints of the extrusion die assembly and upon the desired properties of the resulting article of manufacture. The diameter of the driven feed segment can be adapted to be used as a component of currently available extrusion die systems (e.g., 8" to 28" diameter annular dies). The thickness of the driven feed segment can also be adjusted to control influence of the axial and transverse shear field as resin passes through the radial gap and influence of radial and transverse shear field as resin passes through the annular gap. Also, clearance between the first surface of the driven feed segment and a second surface of a separate stationary module disposed adjacent can be varied to affect transverse shear within resin flowing within the radial gap between the movable and adjacent feed segments.

In one embodiment, the extrusion apparatus 10 may comprise a modular construction and can be combined with additional modules to fabricate an extrusion die assembly that can include one or more discrete conventional modular disks that share a common central longitudinal axis (see briefly FIG. 3, reference number 13) and that may be arranged about the central mandrel. In context, the term "conventional modular disk" refers to a stationary modular disk that can be used to introduce a discrete layer of resin into the annular gap. Conventional modular disks can be of any type that is commonly known to those of skill in the art, such as the type disclosed in U.S. Pat. Nos. 5,076,776 or 5,538,411, both patents incorporated herein by reference in their entirety. Conventional modular extrusion dies include static discs, "plates", or static frustums that are fixed with respect to the central mandrel. In the present invention, driven feed segment 16 can be integrated into a layered assembly together with one or more conventional modular disks or frusta about a central mandrel, for instance in a vertical arrangement. Such assembly thereby defines a common annular passage between the length of the central mandrel and bore of one or more driven feed segments and the bore of conventional components. It should be understood by those of skill in the art that the outer circumference of the mandrel can be changed along its length, and the inner circumference or bore of any single driven feed segment, frustum, or disk positioned about the central mandrel, can be changed along its length as required to obtain the desired annular gap 26. In another embodiment, the extrusion apparatus may include a central mandrel or housing member which is also rotatable about a longitudinal axis.

In one embodiment, a driven feed segment may include at least one substantially planar surface. The at least one substantially planar surface can include grooves tooled therein. In this embodiment, resin flowing within and along these grooves can present a fibrillar structure as it flows toward the annular gap, for example beneath a bounding upper stream of resin introduced to a substantially planar surface. For example, in one embodiment, surface 18 of driven feed segment can include grooves to control the flow of fluids within the radial gap. Grooves can extend radially or spirally throughout or partially within surface 18. The number and geometry of the grooves, as well as the rotational speed of the driven feed segment, can control the size of any emerging fibrous matrix. Such fibrous strands can be used to reinforce the strength properties of the article of manufacture, such as a film, or can provide color or identification uniqueness to the article of manufacture. Such strands can have incorporated therein an additive that responds to an energy source, such as a magnetic field, UV radiation, or the like to impart authentication properties to the article of manufacture. The radius of the grooved portion of surface 18 can extend substantially across the surface, or less than about $\frac{1}{2}$, $\frac{1}{4}$, $\frac{1}{8}$, $\frac{1}{16}$, or $\frac{1}{32}$ of an inch from inner circumference 22.

In the case of film production, the number of streams of resin and the rotational speed of the driven feed segment can be controlled to produce "microlayered" films. As streams of resin proceed through the radial gap and through an annular gap, streams overlay one another and appear upon cross-sectional examination as layer constituents. Layers then exit the modular die assembly, and cool to a solid state. Such microlayered film products can appear as hundreds, or even thousands of layers.

In one aspect, the extrusion apparatus according to the invention can be used to prepare microlayered films. The structure of a resulting microlayered film can be modified by selection of factors including the number of streams that are introduced onto the surface of the driven feed segment, the rotational speed of the at least one driven feed segment, and the diameter and thickness of the driven feed segment. Referring again to FIG. 4A, two streams of resin 84, 86 are depicted as entering the die apparatus and subsequently being divided into multiple streams that are introduced onto the surface of the driven feed segment. Increasing the number of streams introduced onto the surface of the illustrated segment increases the number of potential layers in the resulting film. For example, if sixteen (16) streams are introduced onto the surface of the driven feed segment, after one revolution of the feed segment, the resulting film will have at least 16 layers. However, by arrangement of the number of streams and control of revolutions per minute (rpm) of the driven feed segment, films having in excess of 4000 layers can be made. In one embodiment of the invention, 240 or more streams can be introduced onto the surface of the driven feed segment, rotating at 10 to 20 rpm, to thereby produce film structure having from at least about 2400 to about 4800 layers. In one embodiment, the extrusion die apparatus can be used to produce film having from about 10 to about 4000 layers.

A plurality of feed ports can be provided such as 2, 10, 25, 50, 100, 200, or 300. The number of feed ports can be less than about 400, such as 300, or such as 200, or such as 100, or such as 50, or such as 25, or such as 10, or such as less than 10. Feed ports can be similar to or different from one another with respect to shape, and in dimensions and in placement, as desired to provide any desired order and shape of streams introduced onto the driven feed segment. Feed ports can be of varied geometries, and can include circular, square, rectangular, random, or other geometries, and can be designed in range of sizes from $\frac{1}{32}$ inch to 1 inch (or 1 mm to 25 mm) in diameter or width, and can be $\frac{1}{4}$ inch to 5 inches (or 6 mm to 13 cm) long. In one embodiment each layer entering the annular gap can have an initial thickness of from about 1 to 2 mils or 20 to 25 μm (micrometers).

In one embodiment, at least one driven feed segment can be used in combination with one or more conventional modular disks or frusta that are used within the apparatus to add additional layers into or onto a resulting film structure. Use of a driven feed segment subjects resin to a transverse shear field without requiring rotation of the adjacent inner mandrel or the adjacent outer housing. One or more driven feed segments can be used in combination with conventional modular disk-like or frusto-conical die components, or can be combined with additional driven feed segments, as desired, within the extrusion assembly. The use of a modular driven feed segment may permit the driven feed segment to be combined with one or more other static and/or driven modules of an extrusion die assembly. In one embodiment of the invention, an extrusion apparatus may include one or more driven feed segments, wherein each segment can be rotated in the same or opposite direction relative to another segment, and at the same or different speed as another segment. In one embodiment, the central mandrel and/or housing member can remain stationary whether one, or more than one, driven feed segment is included, and/or whether an annular gap is defined along the outer or inner circumference of one or more driven feed segments of the extrusion apparatus.

The number of streams introduced to the surface of the driven feed segment, the initial width of each stream, and the orientation of streams within the emerging layered film can be controlled to modify various film properties. For example, the inventive extrusion die apparatus having at least one driven feed segment can be used to adjust the properties of the multi-layer film, such as the barrier properties, optical properties, electrical properties, thermal stability, tear resistance, and/or tensile strength. The invention can be used to combine dissimilar resins, for instance barrier and non-barrier resins.

The rotational speed and diameter of the driven feed segment, clearance within the radial and/or annular gaps defined between the driven feed segment and stationary opposing surfaces, and the housing configuration can also be independently varied to affect the shear properties of molten resins, for example, to thereby tailor the structure and strength of the resulting cooled extrudate. In the case of a motor driven feed segment, the rotational speed of the driven feed segment can be controlled independent of flow rate of one of molten resins.

Transverse shear can be used to align or orient polymer molecules. Many thermoplastic resins incur "memory" of past shear field. Transverse shear can be imparted to molecules in addition to that imparted along the machine direction of the film. Such tangential orientation can provide improved transverse strength to linear polymers, particularly for liquid crystalline polymers. In the case of more than one driven feed segment, two driven feed segments rotated in opposite directions can form a molecular mesh that can reinforce the film obliquely.

From the foregoing discussion, it should be evident that the extrusion die apparatus of invention can be used to produce a variety of different articles including pipe, tubing, films, sheets, foams, and laminates. The apparatus comprising at least one driven feed segment can be used in extrusion dies for producing monolayered films, multilayered films, microlayered films and like. The inventive apparatus can also be used to uniformly disperse an additive, or to orient molecules in a film layer. The invention can be used to install molten strands of polymer into a film structure.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An extrusion apparatus comprising:
   at least one driven feed segment having an outer circumference, a bore defining an inner circumference, and a first surface extending between the outer circumference and the bore, the first surface of the at least one driven feed segment for receiving molten resin thereon;
   a support member upon which the at least one driven feed segment is rotatably disposed and wherein said driven feed segment is driven at a rate of rotation that is independent of a flow rate of a molten resin disposed thereon, and wherein the support member includes an inner circumferential wall;
   a central mandrel about which the driven feed segment is rotatably disposed;
   an annular gap disposed between the inner circumference of the driven feed segment and the central mandrel, an annular gap disposed between the inner circumferential wall and the outer circumference of the central mandrel, said annular gaps defining an annular fluid pathway through which molten resin flows from the first surface and through the annular gaps, wherein rotation of said driven feed segment causes resin introduced on the first surface to flow in the direction of the annular gaps from where the resin is introduced on the first surface; and
   a means for preventing molten resin disposed on the first surface from flowing in a direction opposite the annular gap.

2. The extrusion apparatus according to claim 1, wherein the inner circumferential wall includes a surface that is substantially coplanar with the first surface of the driven feed segment.

3. The extrusion apparatus according to claim 1, further comprising a drive device that is in mechanical communication with said driven feed segment; said drive device configured to rotatably drive said driven feed segment about said support member.

4. The extrusion apparatus according to claim 1, further comprising two or more driven feed segments.

5. The extrusion apparatus according to claim 1, comprising a first driven feed segment and a second driven feed segment, wherein the first driven feed segment is rotated in a first direction and the second driven feed segment is rotated in the same or opposite direction of the first driven feed segment.

6. The extrusion apparatus according to claim 1, comprising a first driven feed segment and a second driven feed segment, wherein the first driven feed segment is rotated at one rotational speed and the second driven feed segment is rotated at the same or different rotational speed of the first driven feed segment.

7. The extrusion apparatus according to claim 1, further comprising at least two inlet ports that are configured to introduce two different melt streams onto the first surface of the driven feed segment.

8. The extrusion apparatus according to claim 1, further comprising at least one feed port capable of delivering fluid onto the first surface of the driven feed segment, said port in fluid communication with a molten resin source.

9. The extrusion apparatus according to claim 1, further comprising a plurality of feed ports in fluid communication with an extruder.

10. The extrusion apparatus according to claim 1, further comprising drive means for positively rotating the at least one driven feed segment.

11. The extrusion apparatus according to claim 1, wherein the means for preventing molten resin disposed on the first surface from flowing in a direction opposite the annular gap includes a slip-ring, seal, gasket, or plurality of grooves to prevent resin from flowing in a direction opposite the annular gap.

12. The extrusion apparatus according to claim 1, wherein the driven feed segment comprises an annular-disc having a plate-like geometry.

13. An extrusion assembly comprising:
a central mandrel;
at least one driven feed segment having a substantially planar first surface for receiving a molten resin thereon and a bore rotatably disposed about said central mandrel and defining an annular gap therebetween;
at least one distribution channel disposed upstream of the first surface of the driven feed segment, the distribution channel including a plurality of feed ports through which a plurality of molten streams of resin are introduced onto the first surface, the feed ports disposed opposite the first surface;
a drive device cooperating with said at least one driven feed segment for rotatably driving said driven feed segment about said central mandrel, wherein rotation of said driven feed segment causes resin introduced on the first surface to flow in the direction of the annular gap; and
an orifice in communication with said annular gap so that resin passing through said annular gap exits said assembly, and wherein the at least one driven feed segment includes a slip-ring, seal, gasket, or plurality of grooves to prevent resin from flowing in a direction opposite the annular gap.

14. The extrusion assembly according to claim 13, wherein rotation of the driven feed segment imparts a transverse shear field across the first surface of the driven feed segment.

15. The extrusion assembly according to claim 13, wherein rotation of the driven feed segment imparts a transverse shear field across an inner circumference of said bore.

16. The extrusion assembly according to claim 13, further comprising an end cap module, said end cap module having an inner surface opposite said first surface to define a radial gap therebetween.

17. The extrusion assembly according to claim 16, further comprising at least one feed port in fluid communication with said radial gap.

18. The extrusion assembly according to claim 13, wherein the drive device comprises a drive gear that is attached to a drive shaft and is in mechanical communication with a ring gear disposed on an outer circumference of the driven feed segment so that rotation of said drive shaft causes rotation of the driven feed segment.

19. The extrusion assembly according to claim 16, wherein the at least one driven feed segment is disposed in a modular support member.

20. An extrusion apparatus comprising:
at least one driven feed segment having an outer circumference, a bore defining an inner circumference, and a first surface extending between the outer circumference and the bore, the first surface of the at least one driven feed segment for receiving molten resin thereon;
at least one distribution channel disposed upstream of the first surface of the driven feed segment, the distribution channel including a plurality of feed ports through which a plurality of molten streams of resin are introduced onto the first surface, the feed ports disposed opposite the first surface;
a support member upon which the at least one driven feed segment is rotatably disposed and wherein said driven feed segment is driven at a rate of rotation that is independent of a flow rate of a molten resin disposed thereon,
a central mandrel about which the driven feed segment is rotatably disposed; and
an annular gap disposed between the inner circumference of the driven feed segment and the central mandrel, said annular gap defining an annular fluid pathway, wherein rotation of said driven feed segment causes resin introduced on the first surface to flow in the direction of the annular gap.

21. extrusion apparatus of claim 20, wherein the apparatus includes two distribution channels having an annular-like shape and that are disposed towards the outer circumference of the driven feed segment.

22. An extrusion apparatus comprising:
at least one driven feed segment having an outer circumference, a bore defining an inner circumference, and a first surface extending between the outer circumference and the bore, the first surface of the at least one driven feed segment for receiving molten resin thereon;
at least one distribution channel disposed upstream of the first surface of the driven feed segment, the distribution channel including a plurality of feed ports through which a plurality of molten streams of resin are introduced onto the first surface, the feed ports disposed opposite the first surface;
a support member upon which the at least one driven feed segment is rotatably disposed and wherein said driven feed segment is driven at a rate of rotation that is independent of a flow rate of a molten resin disposed thereon;
a central mandrel about which the driven feed segment is rotatably disposed; and
an annular gap disposed between the inner circumference of the driven feed segment and the central mandrel, said annular gap defining an annular fluid pathway; and wherein the support member includes an inner circumferential wall and the annular gap is disposed between the inner circumferential wall and the outer circumference of the central mandrel, wherein rotation of said driven feed segment causes resin introduced on the first surface to flow in the direction of the annular gap.

23. The extrusion apparatus according to claim 22, wherein the inner circumferential wall includes a surface that is substantially coplanar with the first surface of the driven feed segment.

24. The extrusion apparatus according to claim 22, further comprising a drive device that is in mechanical communication with said driven feed segment; said drive device configured to rotatably drive said driven feed segment about said support member.

25. The extrusion apparatus according to claim 22, further comprising two or more driven feed segments.

26. The extrusion apparatus according to claim 22, comprising a first driven feed segment and a second driven feed segment, wherein the first driven feed segment is rotated in a first direction and the second driven feed segment is rotated in the same or opposite direction of the first driven feed segment.

27. The extrusion apparatus according to claim 22, comprising a first driven feed segment and a second driven feed segment, wherein the first driven feed segment is rotated at one rotational speed and the second driven feed segment is rotated at the same or different rotational speed of the first driven feed segment.

28. The extrusion apparatus according to claim 22, further comprising at least two inlet ports that are configured to introduce two different melt streams onto the first surface of the driven feed segment.

29. The extrusion apparatus according to claim 22, further comprising at least one feed port capable of delivering fluid onto the first surface of the driven feed segment, said port in fluid communication with a molten resin source.

30. The extrusion apparatus according to claim 22, further comprising drive means for positively rotating the at least one driven feed segment.

* * * * *

UNITED STATES PATENT AND TRADEMARK OFFICE
CERTIFICATE OF CORRECTION

| | | |
|---|---|---|
| PATENT NO. | : 7,513,766 B2 | Page 1 of 1 |
| APPLICATION NO. | : 11/247526 | |
| DATED | : April 7, 2009 | |
| INVENTOR(S) | : Peavey et al. | |

It is certified that error appears in the above-identified patent and that said Letters Patent is hereby corrected as shown below:

Column 16,

Line 13, before "extrusion" insert --The--.

Signed and Sealed this

Fourteenth Day of July, 2009

JOHN DOLL
*Acting Director of the United States Patent and Trademark Office*